United States Patent
Yang et al.

(10) Patent No.: US 11,354,215 B2
(45) Date of Patent: Jun. 7, 2022

(54) COMPUTING DEVICE AND METHOD FOR ANALYZING DEVICE

(71) Applicant: Fulian Precision Electronics (Tianjin) Co., LTD., Tianjin (CN)

(72) Inventors: Cheng-Da Yang, Neihu (TW); Yen-Hsuan Chen, New Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 433 days.

(21) Appl. No.: 16/508,393

(22) Filed: Jul. 11, 2019

(65) Prior Publication Data
US 2020/0272550 A1 Aug. 27, 2020

(30) Foreign Application Priority Data
Feb. 22, 2019 (CN) .......................... 201910140988.4

(51) Int. Cl.
*G06F 3/00* (2006.01)
*G06F 11/34* (2006.01)
*G06F 9/445* (2018.01)
*G06F 9/54* (2006.01)

(52) U.S. Cl.
CPC ........ *G06F 11/349* (2013.01); *G06F 9/44505* (2013.01); *G06F 9/54* (2013.01)

(58) Field of Classification Search
CPC ................................... G06F 9/54; G06F 9/445
See application file for complete search history.

(56) References Cited

U.S. PATENT DOCUMENTS

| | | | |
|---|---|---|---|
| 7,668,941 B1 * | 2/2010 | Kathandapani | H04L 61/6022 709/220 |
| 10,303,574 B1 * | 5/2019 | Aalund | G05D 13/62 |
| 2018/0275998 A1 * | 9/2018 | Hanson | G06F 13/124 |

OTHER PUBLICATIONS

D. Montaldo, Clover: Effecient Monitoring of HPC Clusters. (Year: 2009).*
Abusayeed Saifullah, CapNet: Exploiting Wireless Sensor Networks for Data Center Power Capping. (Year: 2009).*

* cited by examiner

*Primary Examiner* — Lechi Truong
(74) *Attorney, Agent, or Firm* — ScienBiziP, P.C.

(57) ABSTRACT

A method for analyzing how a baseboard management controller (BMC) is monitoring a device in an analysis system platform performs an analysis of features of the device being monitored by the BMC. The method receives an IP address of a BMC input by a user, obtains source code corresponding to the IP address and determines application programming interface type corresponding to the source code. A function menu according to the application programming interface type is selected, the function menu comprising at least one item for analysis. The feature performance of the device being monitored is analyzed and recorded and results of the performance analysis are stored.

20 Claims, 4 Drawing Sheets

COMPUTING DEVICE AND METHOD FOR ANALYZING DEVICE

FIELD

The subject matter herein generally relates to computing device and method for analyzing device.

BACKGROUND

OpenBMC is open source software architecture for building a complete baseboard management controller (BMC) in Linux image (Linux image). The traditional method of assessing the monitoring of computer performance by a BMC is to manually input a series of instructions to verify the monitoring of the BMC. This process is time consuming and laborious.

Therefore, there is a room for improvement.

BRIEF DESCRIPTION OF THE DRAWINGS

Implementations of the present disclosure will now be described, by way of embodiments, with reference to the attached figures.

DETAILED DESCRIPTION

Figure 1:
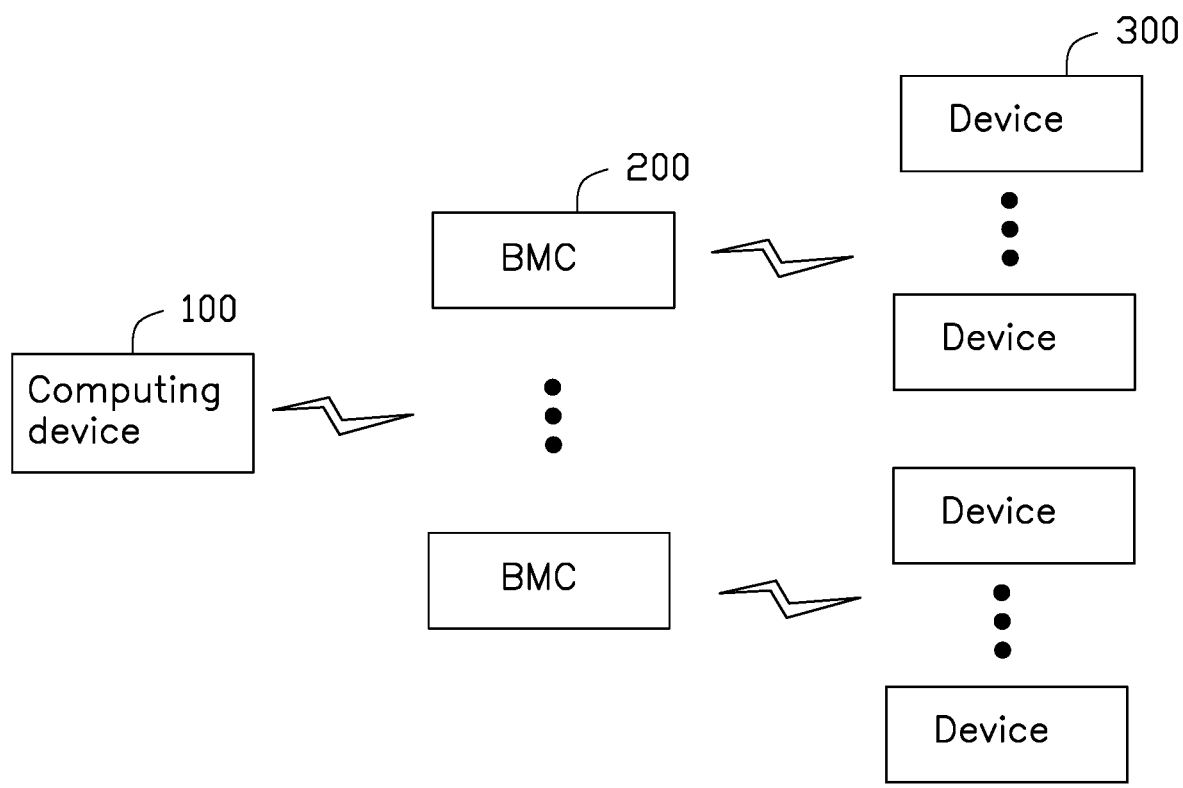
FIG. 1 is a block diagram of an embodiment of a method for analyzing a device.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

FIG. 1 illustrates a computing device 100 in accordance with an embodiment of the present disclosure.

The computing device 100 establishes a connection with at least one baseboard management controller (BMC) 200 through a network. The BMC 200 establishes a connection with at least one device 300 through the network. In one embodiment, the network may be a wired network or a wireless network, such as radio, WI-FI, cellular, satellite, and broadcast.

In one embodiment, the computing device 100 may be a computing device in which monitoring device system analysis software is installed, such as a personal computer and a server. In one embodiment, the server may be a single server, a server cluster, or a cloud server.

The BMC 200 monitors the status of the device such as a server, a high-end switch, a just a bunch of disks (JBOD), and a just a bunch of disks (JBOF) or other hardware-driven devices. The BMC 200 measures the internal physical variables of the device being monitored through the BMC sensor, such as temperature, moderation, power supply voltage, fan speed, communication parameters, and operating system functions. If any of these variables are outside a preset range, the BMC 200 should notify the administrator, and the administrator can use the remote control to apply a solution.

The device 300 monitored by the BMC is a device monitored by the BMC 200, and can include a server, a high-end switch, a JBOD, and a JBOF or other hardware-driven device.

Figure 2:
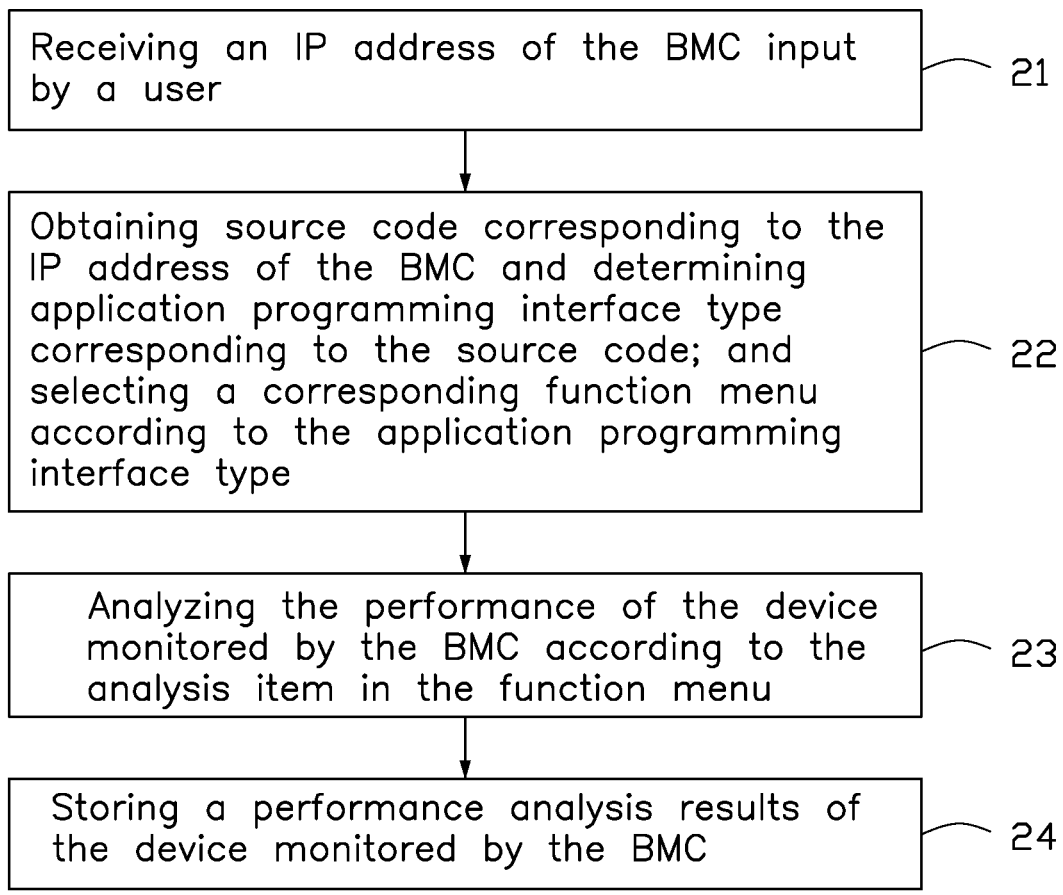
FIG. 2 is flowchart of an embodiment of a method for analyzing a device.

FIG. 2 is flowchart depicting an embodiment of a method for analyzing a device. The method is provided by way of example, as there are a variety of ways to carry out the method. The method described below can be carried out using the configurations illustrated in FIG. 1 for example, and various elements of these figures are referenced in explaining the example method. Each block shown in FIG. 1 represents one or more processes, methods, or subroutines, carried out in the example method. Furthermore, the illustrated order of blocks is illustrative only and the order of the blocks can change. Additional blocks can be added or fewer blocks may be utilized, without departing from the present disclosure. The example method can begin at block 21.

At block 21, in an analysis system platform, an IP address input module receives the IP address of the BMC input by the user.

The analysis system platform can simultaneously monitor several BMCs, and each BMC 200 has an IP address. The BMC 200 of which the user inputs the IP address in the analysis system platform is switched to the BMC to be called.

At block 22, a function menu selection module obtains source code of the BMC corresponding to the IP address of the BMC and determines the application programming interface type corresponding to the source code. The function menu selection module selects a function menu according to the application programming interface type corresponding to the source code.

The function menu includes at least one analysis item.

In an embodiment, the analysis system platform receives different curl instructions, and obtains the source code of the BMC corresponding to the IP address of the BMC. The different curl instructions can include a curl instruction corresponding to the Redfish API and a curl instruction corresponding to the Rest API.

The function menu includes a Redfish function menu and a Rest API function menu.

In an embodiment, the analysis system platform receives a curl instruction corresponding to the Redfish API. If the source code of the BMC is received according to the curl instruction corresponding to the Redfish API, and it is determined that the application programming interface type corresponding to the code type of the source code of the BMC is Redfish API, the Redfish function menu is selected.

If the source code of the BMC is not received, the analysis system platform re-receives the curl command corresponding to the Rest API. If the source code of the BMC is received, indicating that the code type of the source code of the BMC corresponds to the Rest API, the Rest API function menu corresponding to the Rest API is selected.

If the source code of the BMC is still not received, any obstructions to the network are searched for, and a detection is made as to whether the BMC has a monitoring device framework.

The function menu selection module obtains the curl instruction corresponding to the Redfish API in the analysis system platform. The analysis system platform receives the source code of the BMC, and analyzes the performance of the device being monitored by the BMC by using the analysis item in the Redfish function menu.

The analysis items can include support instruction features, reverse command features, sensor data recording features, sensor error detection features, general-purpose input and output characteristics, field replaceable unit read/write features, main read/write features, power control features, and BMC. One or more of firmware characteristics are analyzed, such as program memory unit firmware characteristics, command stress characteristics, restart stress characteristics, bidirectional two-wire synchronous serial bus features, secure file transfer protocol features, channel verification features, and system event logging features.

The analysis system platform users can select one analysis item at a time for analysis, or select multiple analysis items at a time for sequential item analysis by means of configuration files.

The analysis system platform obtains the curl instruction corresponding to the Rest API in the analysis system platform. The analysis system platform receives the source code of the BMC, and analyzes the performance of the device being monitored by the BMC by using the analysis item in the Rest API function menu.

The analysis item can include a BMC connection characteristic, a support instruction feature, a reverse instruction feature, a sensor data recording feature, a sensor error detection feature, a field replaceable unit read/write feature, a main read/write feature, a power control feature, and a substrate management. One or more of controller firmware characteristics, command stress characteristics, restart stress characteristics, bidirectional two-wire synchronous serial bus characteristics can also be analyzed.

The analysis system platform users can select one item for analysis, or multiple items for analysis.

At block 23, a performance analysis module analyzes the performance of the device being monitored by the BMC according to the analysis item in the function menu.

In one embodiment, the performance analysis module compares the data in the source code of the BMC with the data in the database of the analysis system platform.

If the data in the source code of the BMC is consistent with the data in the database or within a range of calibration of the database, the performance analysis module determines that the performance of the device being monitored by the BMC is normal.

If the data in the source code of the BMC is not consistent with the data in the database or not within the range of calibration of the database, the performance analysis module determines that the performance of the device being monitored by the BMC is abnormal.

In one embodiment, the data in the source code of the BMC includes real-time performance data information of the device being monitored.

The data in the database of the analysis system platform is the performance data information of the device being monitored under normal conditions.

In one embodiment, the data of the source code of the BMC includes data for recording server performance, related temperature, and uplink and downlink speed. The database is a preset database, wherein the data of the server to be monitored under normal conditions is stored, and the real-time data monitored by the BMC is compared with the normal data in the database to determine the performance of the current server.

At block 24, a result storage module stores results of performance analysis of the device being monitored.

After analyzing the baseboard management controller source code using the analysis item in the Redfish function menu, if it is determined that the application programming interface type corresponding to the source code is the Redfish API, the analysis system platform generates an analysis report and stores the analysis report in the "Result.csv" file.

If it is determined that the application programming interface type corresponding to the source code is the Rest API, after analyzing the baseboard management controller source code using the analysis item in the Rest API function menu, the analysis system platform generates an analysis report and stores the analysis report in the "Result.csv" file.

Figure 3:
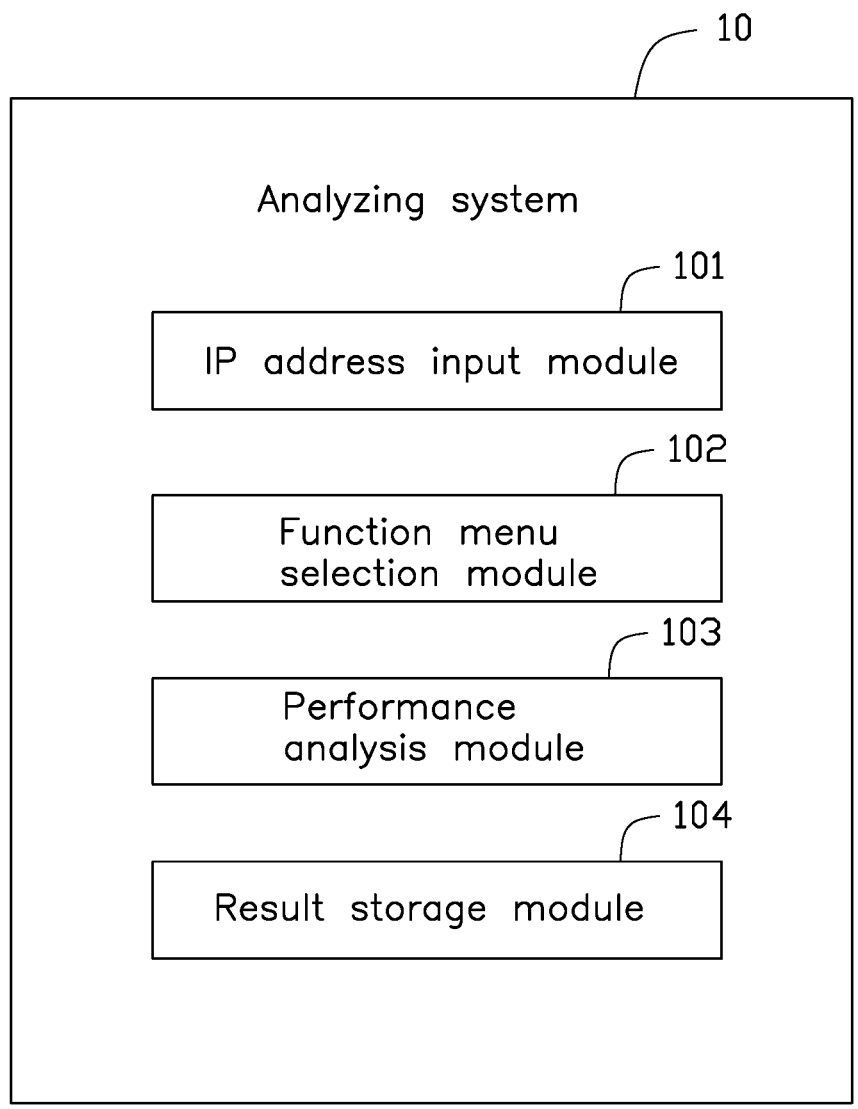
FIG. 3 is a block diagram of an embodiment of a system for analyzing.
Figure 4:
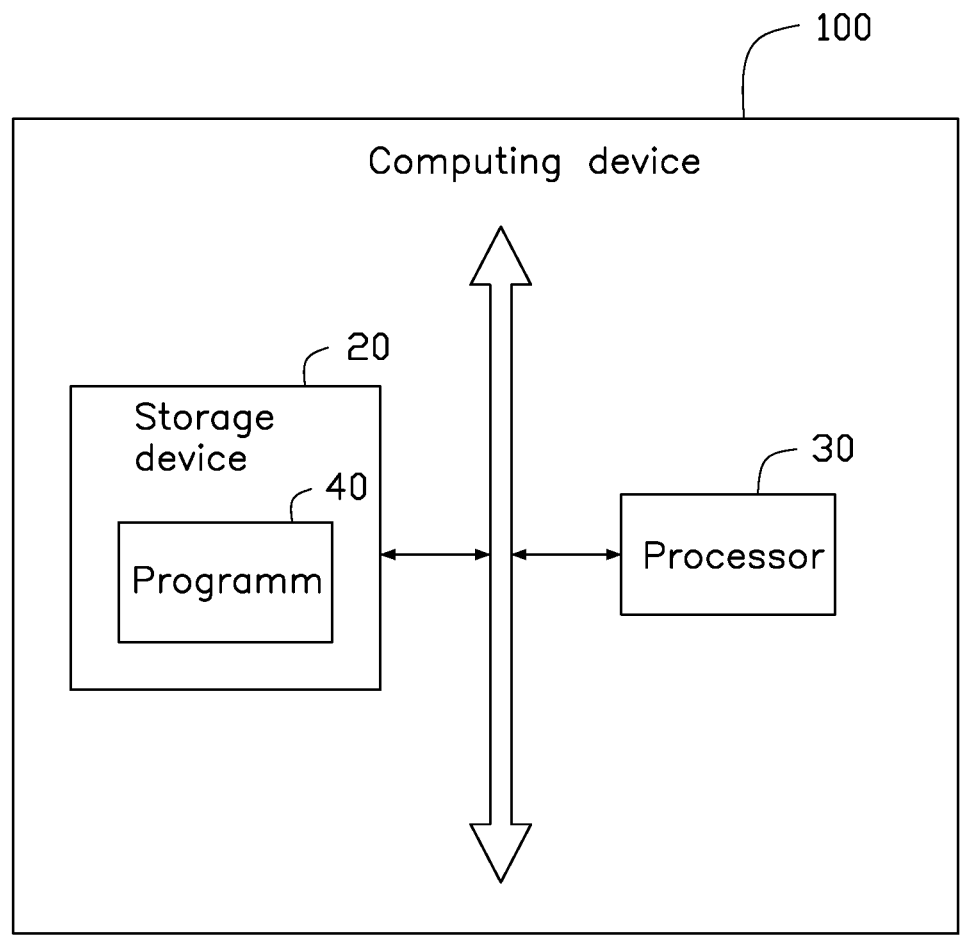
FIG. 4 is a block diagram of an embodiment of a computing device.

The function module of the software device for implementing the method for analyzing device and the hardware device architecture for implementing the method for analyzing device are described in conjunction with FIGS. 3 and 4.

In one embodiment, an analyzing system 10 operates in the computing device 100. The computing device 100 is coupled to the BMC and the device is monitored by the BMC through the network.

The computing device 100 can further include, but is not limited to, a storage device 20 and at least one processor 30. The program code of each program segment may be stored in the storage device 20 and executed by the at least one processor 30 to implement a device monitoring analysis function.

FIGS. 3 and 4 illustrate that the analyzing system 10 can include functional modules consisting of program code. The functional modules can include an IP address input module 101, a function menu selection module 102, a performance analysis module 103, and a result storage module 104.

The modules 101-104 include computer instructions or codes in form of one or more programs that may be stored in the storage device 20, and are executed by the at least one processor 30.

The IP address input module 101 receives the IP address of the BMC input by the user in an analysis system platform.

In one embodiment, the analysis system platform can simultaneously monitor several BMCs, and each BMC 200 has an IP address. The BMC 200 of which the user inputs the IP address is switched to the BMC being called.

The function menu selection module 102 obtains source code of the BMC 200 corresponding to the IP address of the BMC 200 and determines the application programming interface type corresponding to the source code. The function menu selection module selects a function menu according to the application programming interface type corresponding to the source code. The function menu includes at least one item analysis.

In an embodiment, the analysis system platform receives different curl instructions, and obtains the source code of the BMC corresponding to the IP address of the BMC. The different curl instructions can include a curl instruction corresponding to the Redfish API and a curl instruction corresponding to the Rest API.

The function menu includes a Redfish function menu and a Rest API function menu.

In an embodiment, the analysis system platform receives a curl instruction corresponding to the Redfish API. If the source code of the BMC is received according to the curl instruction corresponding to the Redfish API, and it is determined that the application programming interface type corresponding to the code type of the source code of the BMC is Redfish API, the Redfish function menu is selected.

If the source code of the BMC is not received, the analysis system platform re-receives the curl command corresponding to the Rest API. If the source code of the BMC is received, indicating that the code type of the source code of the BMC corresponds to the Rest API, it is the Rest API function menu corresponding to the Rest API which is selected.

If the source code of the BMC is still not received, obstructions in the network are searched for and a detection is made as to whether the BMC has a monitoring device framework.

For example, the analysis system platform monitors five BMCs, and each BMC 200 monitors a server. The BMC 200 is used to monitor the performance of the server, the items monitored include server temperature and system status monitoring, restart, re-power, and power off. User enters the IP address of any BMC 200 in the analysis system platform, and views the BMC 200 corresponding to the IP address.

The function menu selection module 102 obtains the curl instruction corresponding to the Redfish API in the analysis system platform. The analysis system platform receives the source code of the BMC 200, and analyzes the performance of the device monitored by the BMC 200 by using the analysis item in the Redfish function menu.

The analysis items can include support instruction features, reverse command features, sensor data recording features, sensor error detection features, general-purpose input and output characteristics, field replaceable unit read/write features, main read/write features, power control features, and BMC. One or more of firmware characteristics, such as program memory unit firmware characteristics, command stress characteristics, restart stress characteristics, bidirectional two-wire synchronous serial bus features, secure file transfer protocol features, channel verification features, and system event logging features can also be included.

The analysis system platform users can select one or multiple items for analysis at a time.

The analysis system platform obtains the curl instruction corresponding to the Rest API in the analysis system platform. The analysis system platform receives the source code of the BMC 200, and analyzes the performance of the device being monitored by using the analysis item in the Rest API function menu.

The item for analysis can include a BMC 200 connection characteristic, a support instruction feature, a reverse instruction feature, a sensor data recording feature, a sensor error detection feature, a field replaceable unit read/write feature, a main read/write feature, a power control feature, and a substrate management. One or more of controller firmware characteristics, command stress characteristics, restart stress characteristics, bidirectional two-wire synchronous serial bus characteristics can also be included.

The analysis system platform users can select one or multiple items for analysis at a time.

The performance analysis module 103 analyzes the performance of the device being monitored according to the analysis item in the function menu.

In one embodiment, the performance analysis module compares the data in the source code of the BMC 200 with the data in the database of the analysis system platform.

If the data in the source code of the BMC 200 is consistent with the data in the database or within a range of calibration of the database, the performance analysis module determines that the performance of the device being monitored is normal.

If the data in the source code of the BMC 200 is not consistent with the data in the database or not within the range of calibration of the database, the performance analysis module determines that the performance of the device being monitored is abnormal.

In one embodiment, the data in the source code of the BMC 200 includes real-time performance data information of the device being monitored.

The data in the database of the analysis system platform is the performance data information of the device being monitored under normal conditions.

In one embodiment, the data of the source code of the BMC 200 includes data for recording server performance, related temperature, and uplink and downlink speed. The database is a preset database, wherein the data of the server to be monitored under normal conditions is stored, and the real-time data monitored by the BMC 200 is compared with the normal data in the database to determine the performance of the current server.

The result storage module 104 stores results of performance analysis of the device being monitored.

If it is determined that the application programming interface type corresponding to the source code is the Redfish API, after analyzing the baseboard management controller source code using the analysis item in the Redfish function menu, the analysis system platform generates an analysis report and stores the analysis report in the "Result.csv" file.

If it is determined that the application programming interface type corresponding to the source code is the Rest API, after analyzing the baseboard management controller source code using the analysis item in the Rest API function menu, the analysis system platform generates an analysis report and stores the analysis report in the "Result.csv" file.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A method for analyzing device of an analysis system platform, the analysis system platform is configured for performing feature analysis on the performance of the device monitored by a baseboard management controller (BMC), comprising:
   receiving an IP address of the BMC;
   obtaining source code corresponding to the IP address of the BMC and determining application programming interface type corresponding to the source code; and
   selecting a corresponding function menu according to the application programming interface type; wherein the function menu comprises at least one analysis item;
analyzing the performance of the device monitored by the BMC according to the analysis item in the function menu; and
storing a performance analysis results of the device monitored by the BMC;
comparing data in the source code of the BMC with data in a database of the analysis system platform;
determining the performance of the device monitored by the BMC is normal if the data in the source code of the BMC is consistent with the data in the database or within a range of calibration of the database.

2. The method according to claim 1, wherein the analysis system platform receives different curl instructions, and obtains the source code of the BMC corresponding to the IP address of the BMC; and wherein the different curl instructions comprises a curl instruction corresponding to the Redfish API and a curl instruction corresponding to the Rest API.

3. The method according to claim 2, wherein the function menu comprises a Redfish function menu and a Rest API function menu; wherein the analysis system platform receives the curl instruction corresponding to the Redfish API; if the source code of the BMC is received according to the curl instruction corresponding to the Redfish API, and it is determined that the application programming interface type corresponding to the code type of the source code of the BMC is Redfish API, the Redfish function menu is selected; if the source code of the BMC is not received, the analysis system platform re-receives the curl command corresponding to the Rest API; if the source code of the BMC is received, indicating that the code type of the source code of the BMC corresponds to the Rest API, the Rest API function menu corresponding to the Rest API is selected; if the source code of the BMC is still not received, any obstructions to a network are searched for, and a detection is made as to whether the BMC has a monitoring device framework.

4. The method according to claim 3, wherein the analysis items comprises one or more of support instruction features, reverse command features, sensor data recording features, sensor error detection features, general-purpose input and output characteristics, field replaceable unit read/write features, main read/write features, power control features, firmware characteristics, program memory unit firmware characteristics, command stress characteristics, restart stress characteristics, bidirectional two-wire synchronous serial bus features, secure file transfer protocol features, channel verification features, system event logging features.

5. The method according to claim 3, wherein the analysis items comprises one or more of a BMC connection characteristic, a support instruction feature, a reverse instruction feature, a sensor data recording feature, a sensor error detection feature, a field replaceable unit read/write feature, a main read/write feature, a power control feature, controller firmware characteristics, command stress characteristics, restart stress characteristics, bidirectional two-wire synchronous serial bus characteristics.

6. The method according to claim 1, further comprising:
determining the performance of the device monitored by the BMC is abnormal the data in the source code of the BMC is not consistent with the data in the database or not within the range of calibration of the database,
wherein the data in the source code of the BMC includes real-time performance data information of the device monitored by the BMC; and
wherein the data in the database of the analysis system platform is the performance data information of the device monitored by the BMC under normal conditions.

7. The method according to claim 1, further comprising:
analyzing the analysis items one by one according to the analysis item, or performing a sequence function analysis by loading a configuration file; wherein the configuration file comprises a list of the analysis items to be analyzed.

8. A computing device, comprising:
a storage device; and
at least one processor, wherein the storage device stores one or more programs, when executed by the at least one processor, the one or more programs cause the at least one processor to:
receive an IP address of a baseboard management controller (BMC);
obtain source code corresponding to the IP address of the BMC and determining application programming interface type corresponding to the source code; and selecting a corresponding function menu according to the application programming interface type;
wherein the function menu comprises at least one analysis item;
analyze the performance of the device monitored by the BMC according to the analysis item in the function menu; and
store a performance analysis results of the device monitored by the BMC;
compare data in the source code of the BMC with data in a database of the analysis system platform;
determine the performance of the device monitored by the BMC is normal if the data in the source code of the BMC is consistent with the data in the database or within a range of calibration of the database.

9. The computing device according to claim 8, wherein an analysis system platform receives different curl instructions, and obtains the source code of the BMC corresponding to the IP address of the BMC; and wherein the different curl instructions comprises a curl instruction corresponding to the Redfish API and a curl instruction corresponding to the Rest API.

10. The computing device according to claim 9, wherein the function menu comprises a Redfish function menu and a Rest API function menu; wherein the analysis system platform receives the curl instruction corresponding to the Redfish API; if the source code of the BMC is received according to the curl instruction corresponding to the Redfish API, it is determined that the application programming interface type corresponding to the code type of the source code of the BMC is Redfish API, and selecting the Redfish function menu; if the source code of the BMC is not received, the analysis system platform re-receives the curl command corresponding to the Rest API; if the source code of the BMC is received, it is indicated that the code type of the source code of the BMC corresponds to the Rest API, the Rest API function menu corresponding to the Rest API is selected; if the source code of the BMC is still not received, any obstructions to a network are searched for, and a detection is made as to whether the BMC has a monitoring device framework.

11. The computing device according to claim 10, wherein the analysis items comprises one or more of support instruction features, reverse command features, sensor data recording features, sensor error detection features, general-purpose input and output characteristics, field replaceable unit read/ write features, main read/write features, power control features, firmware characteristics, program memory unit firmware characteristics, command stress characteristics, restart stress characteristics, bidirectional two-wire synchronous serial bus features, secure file transfer protocol features, channel verification features, system event logging features.

12. The computing device according to claim 11, wherein the analysis items comprises one or more of a BMC connection characteristic, a support instruction feature, a reverse instruction feature, a sensor data recording feature, a sensor error detection feature, a field replaceable unit read/write feature, a main read/write feature, a power control feature, controller firmware characteristics, command stress characteristics, restart stress characteristics, bidirectional two-wire synchronous serial bus characteristics.

13. The computing device according to claim 8, wherein the at least one processor is further caused to:
  determine the performance of the device monitored by the BMC is abnormal the data in the source code of the BMC is not consistent with the data in the database or not within the range of calibration of the database,
  wherein the data in the source code of the BMC includes real-time performance data information of the device monitored by the BMC; and
  wherein the data in the database of the analysis system platform is the performance data information of the device monitored by the BMC under normal conditions.

14. The computing device according to claim 8, wherein the at least one processor is further caused to:
  analyze the analysis items one by one according to the analysis item, or performing a sequence function analysis by loading a configuration file; wherein the configuration file comprises a list of the analysis items to be analyzed.

15. A non-transitory storage medium having stored thereon instructions that, when executed by a processor of a computing device, causes the processor to perform an analyzing method, wherein the method comprises:
  receiving an IP address of a baseboard management controller (BMC);
    obtaining source code corresponding to the IP address of the BMC and determining application programming interface type corresponding to the source code; and selecting a corresponding function menu according to the application programming interface type; wherein the function menu comprises at least one analysis item;
    analyzing the performance of the device monitored by the BMC according to the analysis item in the function menu; and
    storing a performance analysis results of the device monitored by the BMC;
    comparing data in the source code of the BMC with data in a database of the analysis system platform;
    determining the performance of the device monitored by the BMC is normal if the data in the source code of the BMC is consistent with the data in the database or within a range of calibration of the database.

16. The non-transitory storage medium according to claim 15, wherein an analysis system platform receives different curl instructions, and obtains the source code of the BMC corresponding to the IP address of the BMC; and wherein the different curl instructions comprises a curl instruction corresponding to the Redfish API and a curl instruction corresponding to the Rest API.

17. The non-transitory storage medium according to claim 16, wherein the function menu comprises a Redfish function menu and a Rest API function menu; wherein the analysis system platform receives the curl instruction corresponding to the Redfish API; if the source code of the BMC is received according to the curl instruction corresponding to the Redfish API, it is determined the application programming interface type corresponding to the code type of the source code of the BMC is Redfish API, and selecting the Redfish function menu; if the source code of the BMC is not received, the analysis system platform re-receives the curl command corresponding to the Rest API; if the source code of the BMC is received, it is indicated that the code type of the source code of the BMC corresponds to the Rest API, the Rest API function menu corresponding to the Rest API is selected; if the source code of the BMC is still not received, any obstructions to a network are searched for, and a detection is made as to whether the BMC has a monitoring device framework.

18. The non-transitory storage medium according to claim 17, wherein the analysis items comprises one or more of support instruction features, reverse command features, sensor data recording features, sensor error detection features, general-purpose input and output characteristics, field replaceable unit read/write features, main read/write features, power control features, firmware characteristics, program memory unit firmware characteristics, command stress characteristics, restart stress characteristics, bidirectional two-wire synchronous serial bus features, secure file transfer protocol features, channel verification features, system event logging features.

19. The non-transitory storage medium according to claim 17, wherein the analysis items comprises one or more of a BMC connection characteristic, a support instruction feature, a reverse instruction feature, a sensor data recording feature, a sensor error detection feature, a field replaceable unit read/write feature, a main read/write feature, a power control feature, controller firmware characteristics, command stress characteristics, restart stress characteristics, bidirectional two-wire synchronous serial bus characteristics.

20. The non-transitory storage medium according to claim 15, further comprising:
  determining the performance of the device monitored by the BMC is abnormal the data in the source code of the BMC is not consistent with the data in the database or not within the range of calibration of the database,
  wherein the data in the source code of the BMC includes real-time performance data information of the device monitored by the BMC; and
wherein the data in the database of the analysis system platform is the performance data information of the device monitored by the BMC under normal conditions.

* * * * *